United States Patent [19]
Hamasaki

[11] Patent Number: 5,274,459
[45] Date of Patent: Dec. 28, 1993

[54] SOLID STATE IMAGE SENSING DEVICE WITH A FEEDBACK GATE TRANSISTOR AT EACH PHOTO-SENSING SECTION

[75] Inventor: Masaharu Hamasaki, Kanagawa, Japan

[73] Assignee: Sony Corporation, Tokyo, Japan

[21] Appl. No.: 865,459

[22] Filed: Apr. 9, 1992

[30] Foreign Application Priority Data

Apr. 10, 1991 [JP] Japan .................. 3-106668

[51] Int. Cl.$^5$ .................. H04N 3/14; H04N 5/335
[52] U.S. Cl. .................. 358/213.11; 358/212; 358/213.15
[58] Field of Search .............. 358/212, 213.15, 213.24, 358/213.11; 257/432

[56] References Cited

U.S. PATENT DOCUMENTS

| | | | |
|---|---|---|---|
| 4,518,863 | 5/1985 | Fukuoka et al. | 358/213.15 |
| 4,547,806 | 10/1985 | Herbst et al. | 358/212 |
| 4,974,093 | 11/1990 | Murayama et al. | 358/213.15 |
| 5,016,108 | 5/1991 | Akimoto et al. | 358/212 |

FOREIGN PATENT DOCUMENTS

| | | |
|---|---|---|
| 61-128683 | 6/1986 | Japan . |
| 61-214870 | 9/1986 | Japan . |
| 62-120785 | 6/1987 | Japan . |
| 1-205674 | 8/1989 | Japan . |

*Primary Examiner*—Joseph Mancuso
*Assistant Examiner*—Wendy R. Greening
*Attorney, Agent, or Firm*—Hill, Steadman & Simpson

[57] ABSTRACT

A solid state image sensing device is formed of a plurality of photo-sensing sections arranged in a two-dimensional fashion at a pixel unit in the horizontal and vertical directions. In this case, each of the plurality of photo-sensing sections is formed of a feedback gate transistor whose gate electrode and source electrode are both connected to a vertical signal line, a vertical selection transistor which is connected in series to the feedback gate transistor and whose gate electrode is connected to a horizontal selection line, and a photoelectric conversion element provided under a channel region of each of the feedback gate transistor and the vertical selection transistor, whereby the sensitivity of the solid state image sensing device is increased and the smear thereof can be lowered.

6 Claims, 5 Drawing Sheets

F I G. 6
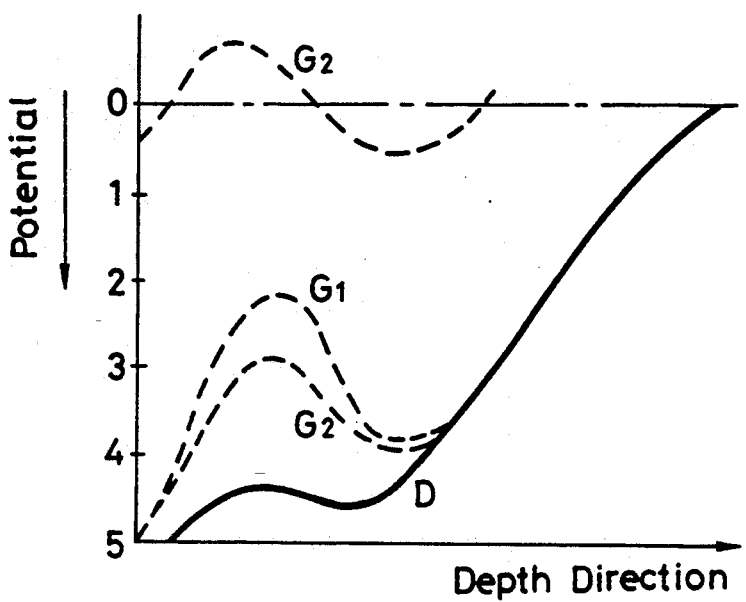
F I G. 7
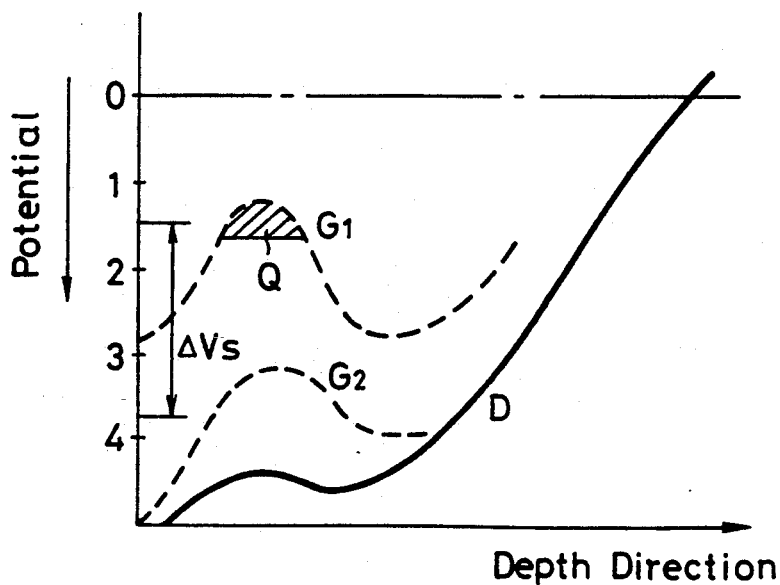

F I G. 8
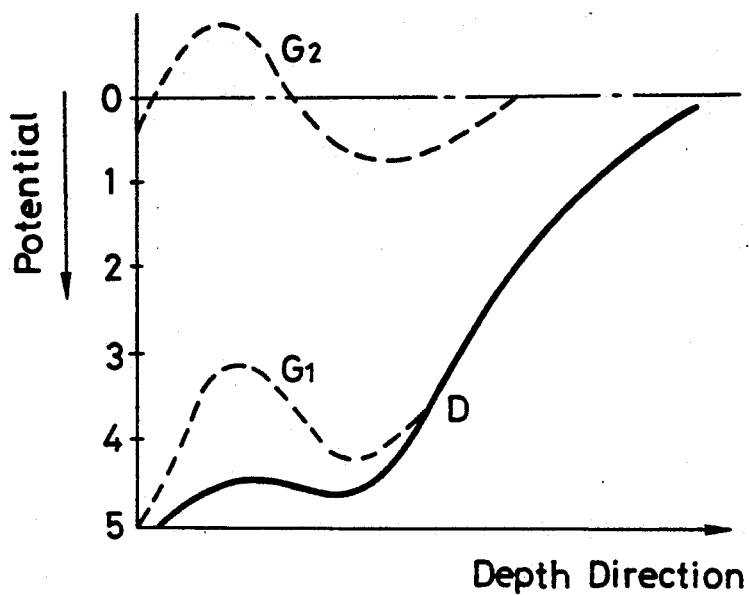
F I G. 9
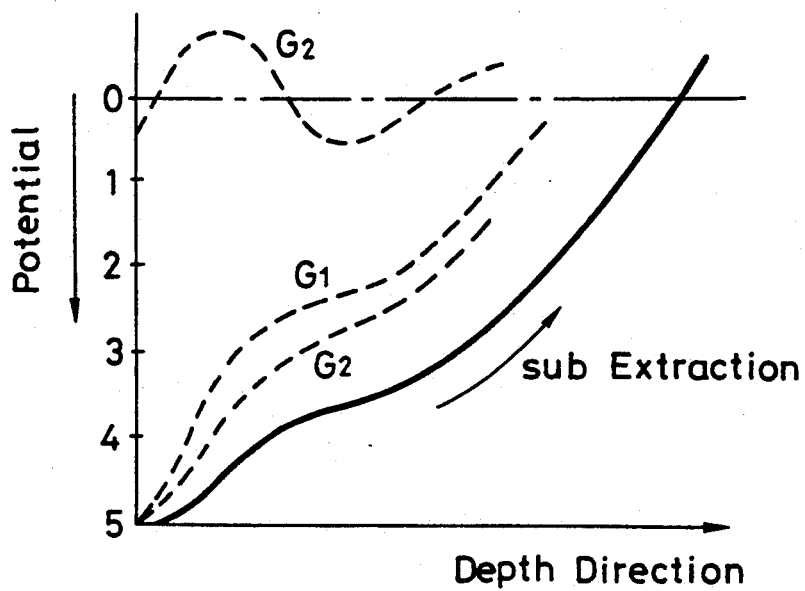

SOLID STATE IMAGE SENSING DEVICE WITH A FEEDBACK GATE TRANSISTOR AT EACH PHOTO-SENSING SECTION

BACKGROUND OF THE INVENTION

Field of the Invention

The present invention relates generally to solid state or CCD image sensing devices and more particularly to an amplification type solid state or CCD image sensing device having an amplification function at every pixel thereof.

Description of the Related Art

In the prior art, as an amplification type solid state image sensing device, there are proposed an SIT (Static Induction Transistor) type solid state image sensing device in which a unit pixel is formed of a static induction transistor, an AMI (Amplified MOS Intelligent) type solid state image sensing device having an amplifying circuit assembled in each pixel, a CMD (Charge Modulation Device) type solid state image sensing device in which each pixel is formed of a MOS photo-transistor, a bipolar type solid state image sensing device, a floating gate type solid state image sensing device and so on.

Of the above various kinds of amplification type solid state image sensing devices, the SIT type, bipolar type and floating gate type solid state image sensing devices have problems with residual image, reset noise, dark current and so on. The AMI type solid state image sensing device has problems with the reset noise, dark current and Vth (threshold voltage) irregularity or the like, while the CMD type solid state image sensing device has problems with blooming and surface dark current, respectively.

OBJECTS AND SUMMARY OF THE INVENTION

Accordingly, it is an object of the present invention to provide a CCD or solid state image sensing device free from the disadvantages encountered in the prior art.

It is another object of the present invention to provide a CCD image sensing device in which a high detection sensitivity element such as a feedback gate transistor is provided in each pixel to increase the sensitivity and to reduce smear.

According to an aspect of the present invention, there is provided a solid state image sensing device which comprises a plurality of photo-sensing sections arranged in two-dimensional fashion at a pixel unit in the horizontal and vertical directions, each of the plurality of photo-sensing sections being formed of a feedback gate transistor whose gate electrode and source electrode are both connected to a vertical signal line, a vertical selection transistor which is connected in series to the feedback gate transistor and whose gate electrode is connected to a horizontal selection line, and a photoelectric conversion element provided under a channel region of each of the feedback gate transistor and the vertical selection transistor.

According to the above solid state image sensing device of the present invention, when first and second gate electrodes are placed at an "H" level, a surface layer formed of electrons is formed on the surfaces of the first and second gate electrodes, by which a dark current generated from an Si-SiO$_2$ boundary can be avoided. Signal charges generated in response to an incident light are accumulated in the portions under the first and second gate electrodes. When the signal charges are overflowed, they are overflowed to a substrate. Upon reading out the signal charge, the second gate electrode of a pixel on a line which is not read out is maintained at an "L" level. At that time, the charges accumulated in the portion under the second gate electrode of a pixel on a line which is read out are transferred to the first gate electrode. An output voltage is fluctuated in response to quantity Q of the charges.

The preceding and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 6 is a potential diagram upon transition from the accumulating state to a read out state;

FIG. 7 is a potential diagram in the read out state;

FIG. 8 is a potential diagram in a selection state; and

FIG. 9 is a potential diagram in a reset state.

DETAILED DESCRIPTION OF THE PREFERRED EMBODIMENT

An embodiment of the present invention will be described with reference to the attached drawings.

Figure 1:
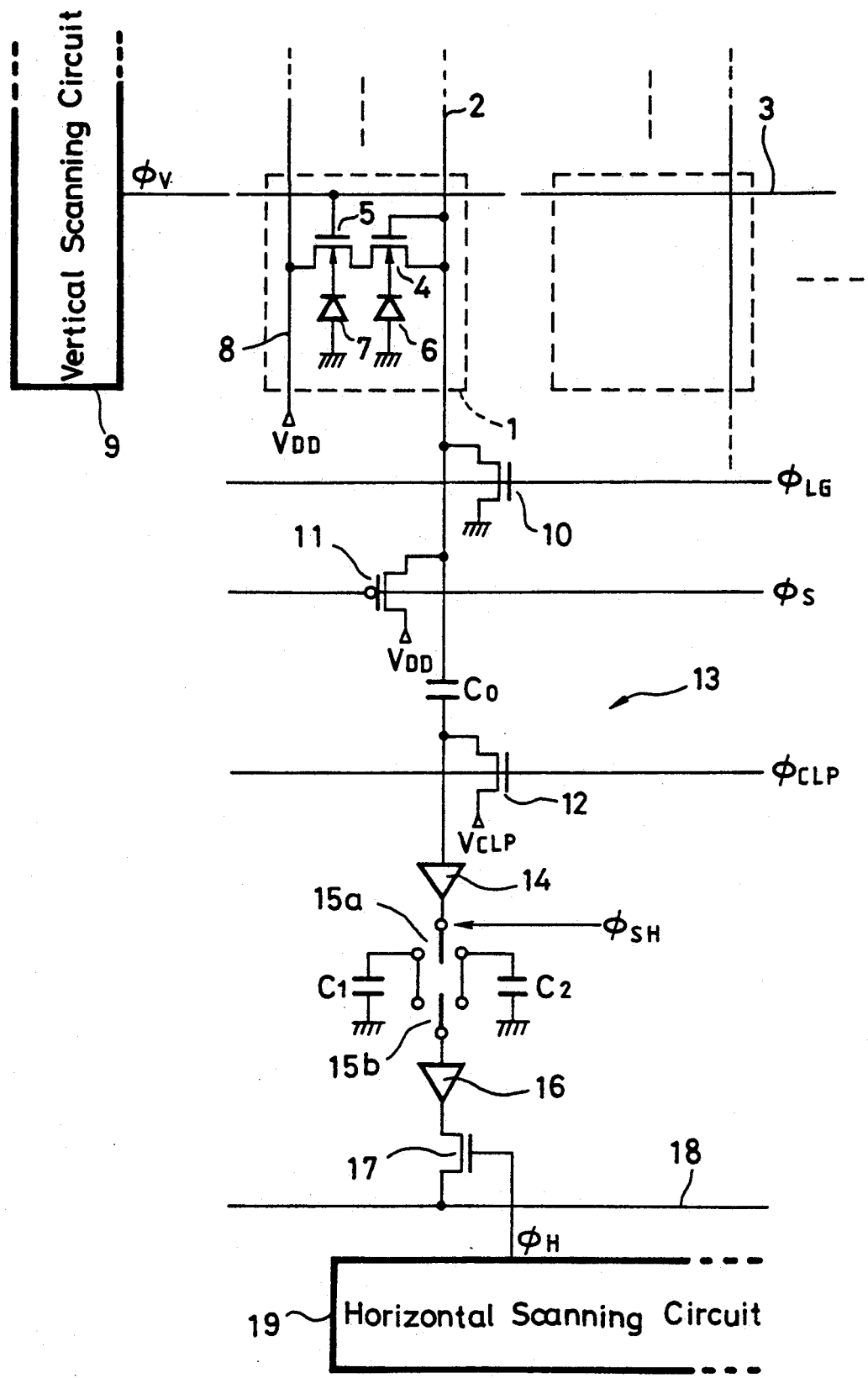
FIG. 1 is a circuit diagram showing a main portion of an embodiment of the CCD image sensing device according to the present invention.

FIG. 1 is a circuit diagram showing a main portion of an embodiment of a CCD image sensing device or solid state image sensing device according to the present invention. In FIG. 1, for the sake of explanation, a plurality of pixels are arranged in matrix fashion or two-dimensional fashion in the horizontal and vertical directions. A circuit structure of only one pixel on a certain line is shown, but all the remaining pixels have the same circuit structure. A photo sensing section 1 of a unit pixel is formed of a feedback gate transistor 4 whose gate and source electrodes are both connected to a vertical signal line 2 and a vertical selection transistor 5 whose gate electrode is connected to a horizontal selection line 3 and which is connected in series to the feedback gate transistor 4. In this case, photo diodes 6 and 7, which serve as photoelectric conversion elements, respectively, are connected to the channel regions of the transistors 4 and 5, respectively.

In the photo-sensing section 1 constructed as above, the drain electrode of vertical selection transistor 5 is applied with a power source voltage V$_{DD}$ through a drain current supply line 8, while the gate electrode thereof is applied with a vertical scanning pulse $\phi_v$ through the horizontal selection line 3 from a vertical scanning circuit 9 to thereby select a horizontal line.

When one horizontal line is selected, the signal charges stored in the photo diodes 6, 7 of the pixels on the selected horizontal line in response to an incident light thereon are amplified by the respective feedback gate transistors 4 and are then delivered to the vertical signal lines 2, respectively.

A transfer gate switch 11 formed of a load MOS transistor 10 formed of a P-type MOS-FET is connected to the vertical signal line 2. The amplified output of each pixel, which is delivered to the vertical signal line 2, is stored in a noise elimination capacitor $C_0$. A clamp switch 12 is connected to the output terminal of the capacitor $C_0$ so that when the clamp switch 12 is turned ON by the application of a clamp pulse $\phi_{CLP}$ to its gate electrode, the potential at the output terminal of capacitor $C_0$ is clamped at a clamp level $V_{CLP}$. The noise elimination capacitor $C_0$ and the clamp switch 12 form a CDS (Correlation Double Sampling) circuit 13 which reduces a noise such as reset noise and so on contained in the output signal of each pixel.

The output from the noise elimination capacitor $C_0$ passes through a buffer amplifier 14, is selectively supplied to a sample and hold capacitor $C_1$ or $C_2$ by a change-over switch 15a, and is then sampled and held in these capacitors $C_1$ and $C_2$. The switching control of change-over switch 15a is carried out at every line by a sample and hold pulse $\phi_{SH}$ which is generated during the horizontal blanking period. Therefore, for example, the outputs from the pixels on an even line are held in the capacitor $C_1$, while the outputs from the pixels on an odd line are held in the capacitor $C_2$, respectively. The held outputs from the capacitors $C_1$ and $C_2$ are selected by a change-over switch 15b, are passed through a buffer amplifier 16, and are then delivered to a horizontal signal line 18 by the switching control of a horizontal gate switch 17 which is controlled in its switching by a horizontal shift pulse $\phi_H$ derived from a horizontal scanning circuit 19.

Figure 2:
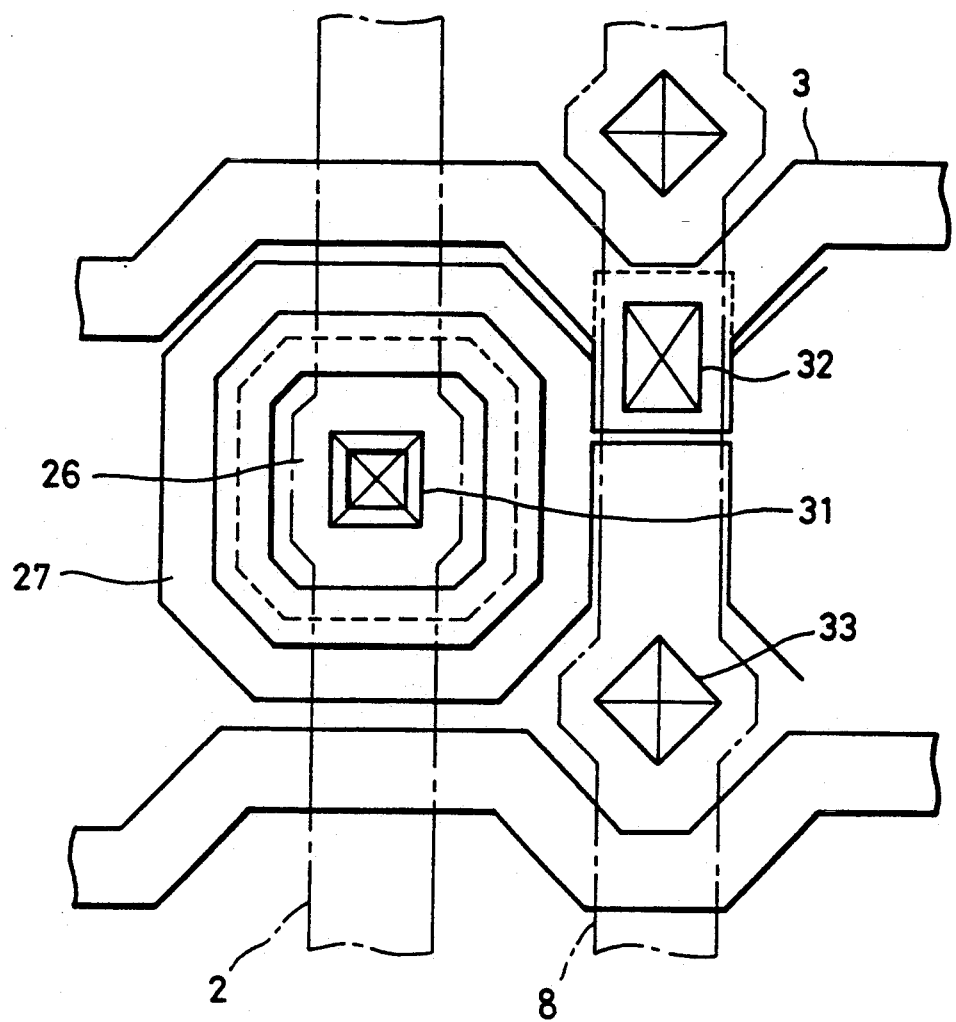
FIG. 2 is a plan view showing one unit cell of the embodiment shown in FIG. 1.
Figure 3:
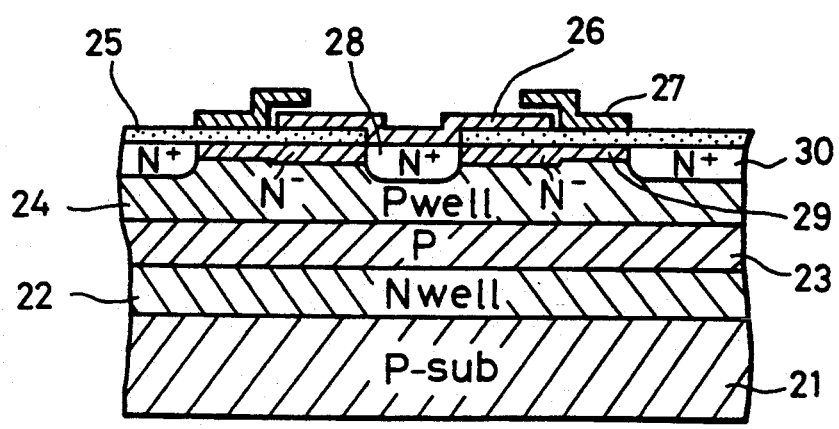
FIG. 3 is a cross-sectional view showing the structure of the one unit cell.

FIGS. 2 and 3 are respectively plan and cross-sectional views showing the structure of one unit cell (unit pixel).

First, as shown in FIG. 3, on a P-type silicon substrate 21 there is formed an N-type well 22 on which a P-type well 24 is formed through a P-type impurity layer 23. On the surface of P-type well 24 there are formed first and second transparent gate electrodes 26 and 27, each being made of a thin poly-silicon, through a silicon oxide ($SiO_2$) film 25. The center portion of the first gate electrode 26 is in direct contact with the surface of P-type well 24, and an $N^+$-type source region 28 is formed on the surface side of P-type well 24 at its contact portion. Thus, the center portion of first gate electrode 26 is connected to the vertical signal line 2 through a contact 31 as shown in FIG. 2 to thereby form the above-mentioned feedback gate transistor 4.

An $N^-$-type channel region 29 is formed at a portion around the source region 28 and opposing the first and second gate electrodes 26 and 27. Further, an $N^+$-type drain electrode 30 is formed around the channel region 29. As shown in FIG. 2, the second gate electrode 27 is connected to the horizontal selection line 3 through a contact 32, and the drain region 30 is connected to the drain current supply line 8 through a contact 33, respectively, whereby the afore-said vertical selection transistor 5 is formed.

Figure 4:
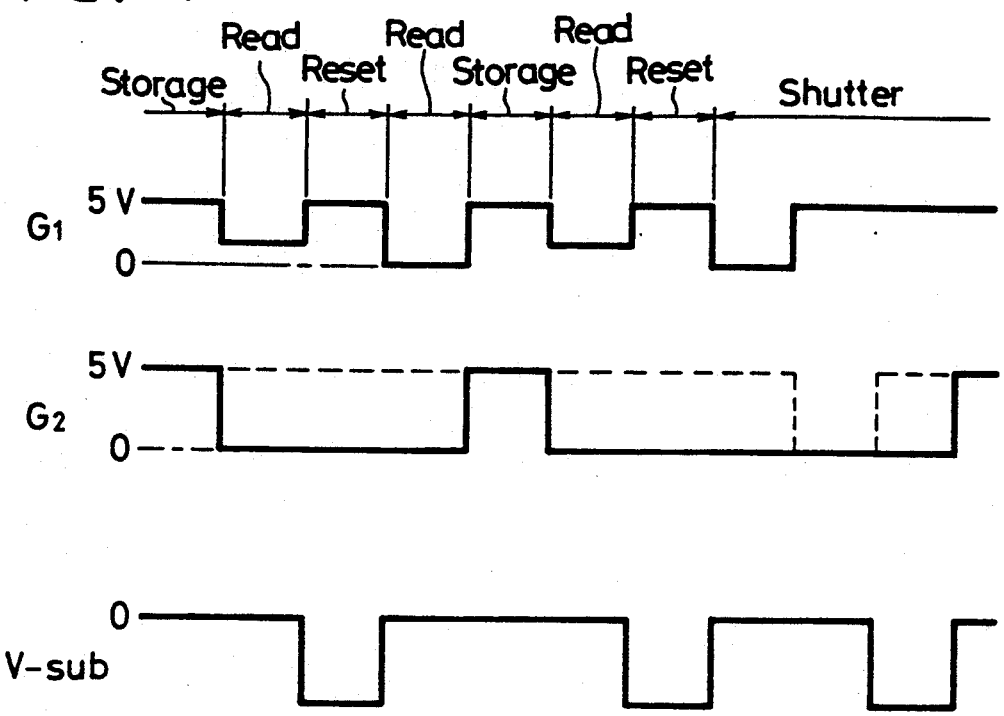
FIG. 4 is a timing chart showing voltages G$_1$ and G$_2$ of first and second gate electrodes and a substrate voltage V-sub during the vertical blanking period.

The operation of a unit cell constructed as above will be now described with reference to FIG. 4 showing timing charts and FIGS. 5 to 9 showing potential distributions, respectively. FIG. 4 shows, during the vertical blanking period, the timing charts of voltages $G_1$ and $G_2$ applied to the first and second gate electrodes 26 and 27, and a voltage V-sub applied to the substrate 21, while FIGS. 5 to 9 show the potential distributions of the first and second gate electrodes 26, 27 and the drain region 30 in the depth direction thereof.

Figure 5:
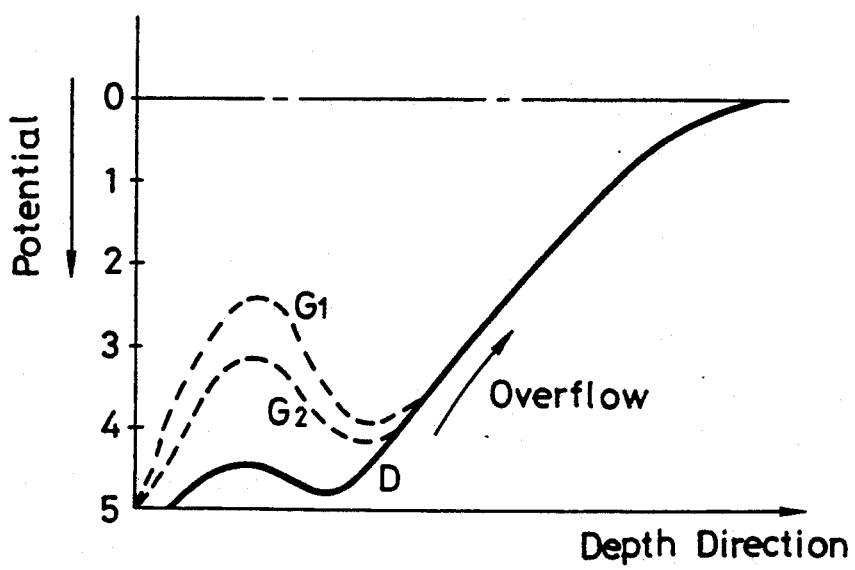
FIG. 5 is a potential diagram in an accumulating state.

In FIG. 5 which shows the storing state of holes, when the vertical signal line 2 and the horizontal selection line 3 are both placed at an "H" level (for example, 5 V) and hence the first and second gate electrodes 26 and 27 are both at an "H" level, a surface layer formed of electrons is formed on the surfaces of first and second gate electrodes 26 and 27, respectively. The surface layers of electrons can avoid a dark current generated from the Si-$SiO_2$ boundary. The holes produced by the photoelectric conversion are accumulated in the portion under the first and second gate electrodes 26 and 27. In this case, overflowed holes are overflowed to the silicon substrate 21.

During the process changing from the accumulating state to the read-out state, as shown in FIG. 6, if the horizontal selection line 3, which is not selected in a Y direction (vertical direction), is at an "L" level (for example, 0V), the second gate electrode 27 is placed at a "L" level. Then, if the load MOS transistor 10 (refer to FIG. 1) connected to the vertical signal line 2 is placed in an ON-state, the feedback gate transistor 4 of a source-follower configuration in one pixel goes into its operating state. In the read-out state shown in FIG. 7, the holes accumulated in the second gate electrode 27 enter into the first gate electrode 26. Further, the output current is changed in response to a quantity Q of the holes in a range $\Delta V_S$ shown in FIG. 7.

When the read-out is ended, the load MOS transistor 10 is turned OFF and the first gate electrode 26 is at a "H" level as shown in FIG. 8. Next, if a negative pulse is applied to the silicon substrate 21, as shown in FIG. 9, the holes in the line where the second gate electrode 27 is at the "H" level are drained to the silicon substrate 21. Next, the application of the negative pulse to the silicon substrate 21 is released and the load MOS transistor 10 is turned ON to read the vacant state, whereby a difference between the state where the signal is stored in the capacitor $C_1$ in FIG. 1 and the vacant state is stored. By obtaining this difference, a threshold voltage (Vth) irregularity, smear and so on can be reduced. As to the other one line in the vertical direction, the difference between the signals is similarly stored in the capacitor $C_2$. During the effective period, the signal charges stored in the capacitors $C_1$ and $C_2$ are read out to the horizontal signal line 18 through the buffer amplifier 16 by the switching control of the horizontal gate switch 17 carried out by the horizontal scanning circuit 19.

According to the present invention as set forth above, at every photo-sensing section at a pixel unit, there is provided the feedback gate transistor whose gate and source electrodes are connected to the vertical signal line and the vertical selection transistor which is connected in series to the feedback gate transistor and whose gate electrode is connected to the horizontal selection line. The photoelectric conversion is performed by the photo diodes under the respective gate electrodes. Thus, by the action of the feedback gate transistor, the sensitivity can be made high and the smear is lowered.

Having described the preferred embodiment of the invention with reference to the accompanying drawings, it is to be understood that the present invention is not limited to that precise embodiment and that various changes and modifications thereof could be effected by one skilled in the art without departing from the spirit or scope of the novel concepts of the invention as defined in the appended claims.

What is claimed is:

1. A solid state image sensing device, comprising: a plurality of photo-sensing sections arranged in two-dimensional fashion in horizontal and vertical directions, each of said plurality of photo-sensing sections being formed of a feedback gate transistor whose gate electrode and source electrode are both connected to a vertical signal line, a vertical selection transistor which is connected in series to said feedback gate transistor and whose gate electrode is connected to a horizontal selection line, first and second photoelectric conversion elements, the first photoelectric conversion element being provided under a channel region of said feedback gate transistor and the second photoelectric conversion element being provided under a channel region of said vertical selection transistor, and a drain electrode of said vertical selection transistor being connected to a first potential and said source electrode of said feedback transistor being connected through load means to a second potential.

2. A solid state image sensing device as claimed in claim 1, in which each of said photoelectric conversion elements is a photo-diode.

3. A solid state image sensing device as claimed in claim 1, in which said feedback gate transistor and vertical selection transistor are formed together in common by a P-type silicon substrate, an N-type well region formed thereon, a P-type well region formed thereon through a P-type impurity layer, first and second transparent gate electrodes formed on a silicon oxide film over said P-type well region, an N+-type source region formed on a surface of said P-type well region, said source region being connected to said vertical signal line, an N−-type channel region provided at a portion around said source region and opposing said source region, an N+-type drain region formed around said channel region, and said second gate electrode being connected through a first contact to said horizontal selection line and said drain region being connected through a second contact to said drain current supply line.

4. An image sensing device according to claim 1 wherein said first and second photoelectric conversion elements are formed in common beneath the first and second gate electrodes.

5. A solid state image sensing device, comprising: a plurality of photo-sensing sections arranged in two-dimensional fashion in horizontal and vertical directions, each of said plurality of photo-sensing sections being formed of a feedback gate transistor whose gate electrode and source electrode are both connected to a vertical signal line, a vertical selection transistor which is connected at one end of its channel in series to said feedback gate transistor whose gate electrode is connected to a horizontal selection line, and the other end of its channel being connected to a supply line, and first and second photoelectric conversion elements, the first photoelectric conversion element being provided under a channel region of said feedback gate transistor and the second photoelectric conversion element being provided under a channel region of said vertical selection transistor, and the first and second photoelectric conversion elements being formed as a common region.

6. A solid state image sensing device, comprising:
a semiconductor substrate of a first conductivity type;
a vertical selection transistor of a second conductivity type formed on said semiconductor substrate and having a channel region of said second conductivity type;
a gate electrode of said vertical selection transistor being connected to a horizontal selection line;
a drain electrode of said vertical selection transistor being connected to a first potential;
a feedback gate transistor of said second conductivity type formed on said semiconductor substrate, said feedback transistor having a channel region of said second conductivity type and connected in series to said vertical selection transistor; and
a source electrode and a gate electrode of said feedback gate transistor being both connected to a vertical signal line, said vertical signal line being connected through load means to a second potential.

* * * * *